(12) United States Patent
Sharma et al.

(10) Patent No.: US 7,134,035 B2
(45) Date of Patent: Nov. 7, 2006

(54) METHOD FOR GENERATING A SYNCHRONIZATION SIGNAL BASED ON THE CLOCK RATIO BETWEEN TWO CLOCK DOMAINS FOR DATA TRANSFER BETWEEN THE DOMAINS

(75) Inventors: Anup K. Sharma, Sunnyvale, CA (US); Venkatram Krishnaswamy, Sunnyvale, CA (US)

(73) Assignee: Sun Mircosystems, Inc., Santa Clara, CA (US)

( * ) Notice: Subject to any disclaimer, the term of this patent is extended or adjusted under 35 U.S.C. 154(b) by 440 days.

(21) Appl. No.: 10/452,247

(22) Filed: May 30, 2003

(65) Prior Publication Data

US 2004/0243869 A1    Dec. 2, 2004

(51) Int. Cl.
*G06F 1/04* (2006.01)
(52) U.S. Cl. .................... 713/500; 713/1; 713/400; 713/500; 327/100
(58) Field of Classification Search ................ 713/500, 713/400, 1; 326/93; 327/100
See application file for complete search history.

(56) References Cited

U.S. PATENT DOCUMENTS

| | | | | |
|---|---|---|---|---|
| 5,243,703 A | * | 9/1993 | Farmwald et al. | 713/400 |
| 5,256,912 A | * | 10/1993 | Rios | 327/144 |
| 5,347,559 A | * | 9/1994 | Hawkins et al. | 377/54 |
| 5,422,914 A | * | 6/1995 | Snyder | 375/354 |
| 5,459,855 A | | 10/1995 | Lelm | |
| 5,553,275 A | * | 9/1996 | Langendorf | 713/500 |
| 5,703,502 A | | 12/1997 | Grewal et al. | |
| 5,754,833 A | * | 5/1998 | Singh et al. | 713/400 |
| 5,905,766 A | * | 5/1999 | Nguyen | 375/354 |
| 5,961,649 A | | 10/1999 | Khandekar et al. | |
| 6,033,441 A | * | 3/2000 | Herbert | 713/375 |
| 6,311,285 B1 | * | 10/2001 | Rodriguez et al. | 713/401 |
| 6,327,667 B1 | * | 12/2001 | Hetherington et al. | 713/500 |

* cited by examiner

*Primary Examiner*—Thomas Lee
*Assistant Examiner*—Sean Weinman
(74) *Attorney, Agent, or Firm*—Martine Penilla & Gencarella, LLP

(57) ABSTRACT

A method for communicating across first and second frequency domains of an integrated microchip is provided. The method initiates with determining a clock ratio between the first frequency domain and the second frequency domain. The first frequency domain is associated with a faster clock cycle. Then, a synchronizing signal based upon the clock ratio is generated. The synchronizing signal coordinates communication of data between the first and second frequency domains. Next, the data is transferred between respective frequency domains according to the synchronizing signal. A microchip and a system enabling synchronous data transfer across different frequency domains are also provided.

17 Claims, 6 Drawing Sheets

Fig. 1 *(prior art)*

METHOD FOR GENERATING A SYNCHRONIZATION SIGNAL BASED ON THE CLOCK RATIO BETWEEN TWO CLOCK DOMAINS FOR DATA TRANSFER BETWEEN THE DOMAINS

BACKGROUND OF THE INVENTION

1. Field of the Invention

The present invention relates generally to microprocessors, and more specifically to a method and apparatus for the transfer of data across disparate within a micro-chip.

2. Description of the Related Art

In a multi-processor environment, it is important to transmit data between processors. For example, system on a chip (SoC) technology enables the packaging of all the parts and electronic circuits for a system on an integrated circuit. This technology may be used for cell phones, digital cameras, and other consumer electronics. Here, multiple processors may be in communication with each other. The highly integrated micro-chips operate various parts of the chip at different frequencies. The conventional approach to the communication across different frequency domains is to treat each clock as completely independent and the interface as completely asynchronous.

FIG. 1 is a simplified schematic of an apparatus for accommodating the multiple clock domains associated with a system on a chip. Region 100 is associated with clock domain A while region 102 is associated with clock domain B. Input data X 106 comes into storage cell F1 108 operating at a frequency associated with clock domain A. Double synchronizer 104 includes storage cells F2 110 and F3 112 which are driven at a frequency associated with clock domain B. The configuration of double synchronizer 104 enables protection from a metastable condition occurring between storage cell F2 110 and F3 112 through a logic threshold adjustment.

Therefore, between each clock domain three types of storage cells are necessary and the special design, i.e., design complexity, of the double synchronizer configuration and storage cells F2 110 and F3 112. Furthermore, the amount of time associated with converting input data X to output data Y is non-deterministic. That is, due to clock skew between clock domain A and clock domain B the timing can not be determined. Thus, for scan testing or debugging purposes deterministic behavior is achieved by forcing clock A and clock B to be the same through special test circuitry. However, this does not produce the actual functionality of operating conditions as the timing of events are being changed. Therefore, the chip may pass during the system debug but fail during functional testing. Another shortcoming of this technique is the relatively high overhead and transfer latency associated with the technique.

In light of the foregoing, it is desired to implement a design and scheme to communicate across frequency domains with a minimum of overhead with respect to the design and the latency of the data transfer across the frequency domains.

SUMMARY OF THE INVENTION

Broadly speaking, the present invention fills these needs by providing a protection scheme for state information where the number of bits associated with the state information is minimized in order to realize a savings in the area of a chip associated with the protection scheme. The present invention can be implemented in numerous ways, including as a process, an apparatus, a system, a device, or a method. Several embodiments of the present invention are described below.

In one embodiment, a method for communicating across first and second frequency domains of an integrated microchip is provided. The method initiates with determining a clock ratio between the first frequency domain and the second frequency domain. The first frequency domain is associated with a faster clock cycle. Then, a synchronizing signal based upon the clock ratio is generated. The synchronizing signal coordinates communication of data between the first and second frequency domains. Next, the data is transferred between respective frequency domains according to the synchronizing signal.

In another embodiment, an apparatus configured to communicate data across different frequency domains is provided. The apparatus includes a first storage cell operating at a first clock frequency and a second storage cell operating at a second clock frequency. The second storage cell is designed to receive an output of the first storage cell. The apparatus includes synchronizing signal circuitry associated with the second storage cell. The synchronizing signal circuitry is configured to control acceptance of the output of the first storage cell through a synchronizing signal. The synchronizing signal correlates the second clock frequency to the first clock frequency in order to define a window for communicating data between the first storage cell and the second storage cell.

In still yet another embodiment, an electronic system is provided. The system includes a microchip having a first region operating at a first clock speed and a second region operating at a second clock speed. The microchip includes a first storage cell operating at the first clock speed and a second storage cell operating at the second clock speed. The second storage cell is designed to receive an output of the first storage cell. Synchronizing signal circuitry associated with the second storage cell is provided. The synchronizing signal circuitry is configured to control acceptance of the output of the first storage cell through a synchronizing signal. The synchronizing signal correlates the second clock speed to the first clock speed in order to define a window for communicating data between the first storage cell and the second storage cell. Logic for generating values provided to the first and second storage cells is included.

Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

An invention is described for a system, device and method for efficiently transferring data across different clock frequency domains. It will be obvious, however, to one skilled in the art, that the present invention may be practiced without some or all of these specific details. In other instances, well known process operations have not been described in detail in order not to unnecessarily obscure the present invention. The term about as used to herein refers to +/−10% of the referenced value.

The embodiments of the present invention provide a system, device and method enabling the transfer of data across different clock frequencies in a deterministic manner that minimizes overhead. The deterministic manner allows for the elimination of special test circuitry that forces the clocks frequencies to act in a certain manner during system debug, e.g., scan testing. Accordingly, the system or chip behaves in the same manner during debug operations as during functional performance. In one embodiment, a storage cell, associated with a particular clock frequency, that is receiving or transmitting data to a destination associated with another clock frequency is enabled through a synchronization signal. The synchronization signal correlates the different clock frequencies in order to define a receipt or transmission window. The receipt and transmission windows are adjusted based on a ratio between the different clock frequencies. Thus, the embodiments described below enable data to be either transmitted to or sampled from a storage cell associated with a different frequency, within 1.5 clock cycles of the faster clock.

Figure 1:
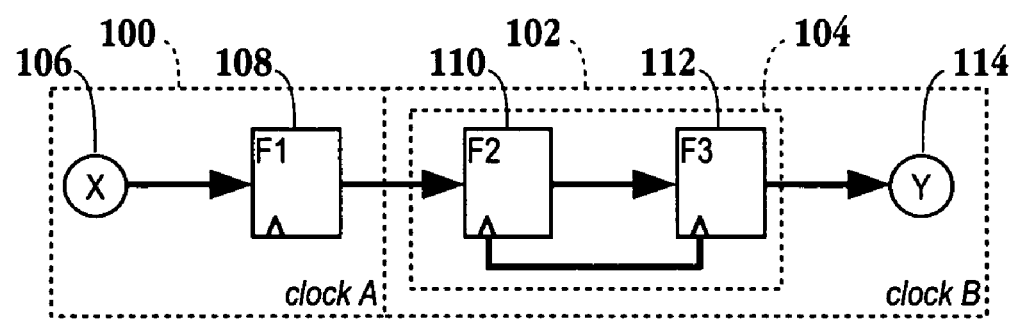
FIG. 1 is a simplified schematic of an apparatus for accommodating the multiple clock domains associated with a system on a chip.
Figure 2:
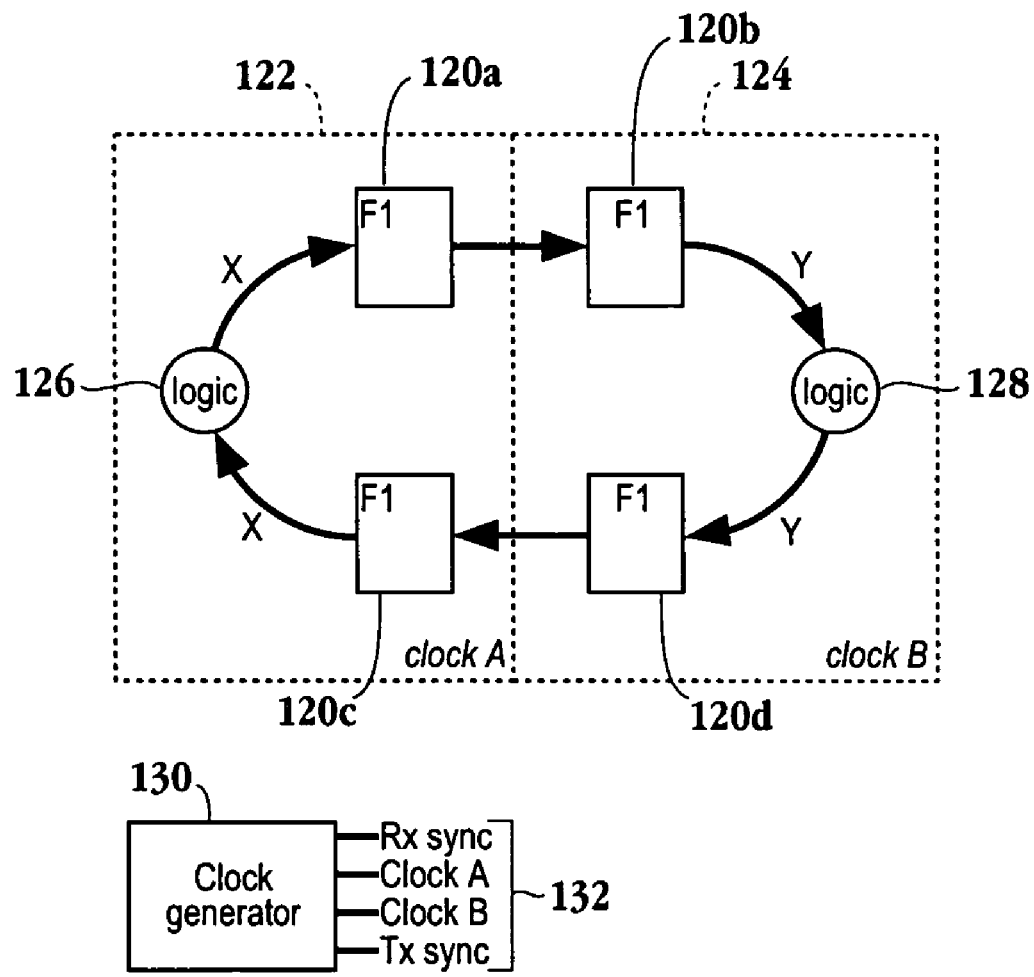
FIG. 2 is a simplified schematic diagram illustrating the transfer of data across different clock domains in accordance with one embodiment of the invention.

FIG. 2 is a simplified schematic diagram illustrating the transfer of data across different clock domains in accordance with one embodiment of the invention. Storage cells 120*a* and 12*c* are within clock domain A 122. Storage cells 120*b* and 120*d* are within clock domain B 124. For exemplary purposes, clock B is associated with a faster clock speed than clock A. Logic 126 provides a value for storage cell 120*a*, while logic 128 provides a value for storage cell 120*d*. Storage cell 120*a* then transmits the value to storage cell 120*b* which is associated with a different clock domain. As will be explained in more detail below, the transfer of data from storage cell 120*a* to storage cell 120*b* is achieved through a determined window based on a ratio of clock speed associated with clock B and a clock speed associated with clock A. Clock generator 130 produces four signals 132. The four signals include a receive synchronization signal, a transmit synchronization signal, clock A and clock B. In one embodiment, the receive synchronization signal and the transmit synchronization signal are based on clock B, which is the faster clock speed. As clock generator 130 is responsible for generating clocks A and B, it should be appreciated that it may be determined when the signals from clock A and clock B line up. Thus, the synchronization signals can be generated at appropriate times in order for the efficient transfer of data across different clock domains. That is, logic within clock generator 130 can accomplish the production of the appropriate signals. Accordingly, for the transmission of data from storage cell 120*a* to storage cell 120*b* a receive synchronization signal is communicated to storage cell 120*b* in order for the receipt of data from storage cell 120*a*. Similarly, when data is being transmitted from storage cell 120*b* to storage cell 120*c*, a transmit synchronization signal is communicated to storage cell 120*d* in order to allow for the efficient transmission data to storage cell 120*c*. In other words, storage cell 120*d* becomes enabled when the rising edge of both clocks A and B will line up to allow for the data transfer. In addition, storage cell 120*d* is enabled to transmit data when the rising edge of both clocks A and B will line up to allow for the transfer. Consequently, the storage cells 120*a* through 120*d* can be of the same design, e.g., where each of the storage cells is a flip-flop, a standard master/slave design can be incorporated. Accordingly, there is no need for the conventional double synchronization configuration. Furthermore, the behavior is deterministic, i.e., it is known when the clocks will transfer data over. It should be appreciated that FIG. 2 shows four storage circuits for exemplary purposes only. That is, before storage cells are provided in order to show data being transmitted from clock A to clock B and data being transmitted from clock B to clock A.

Figure 3:
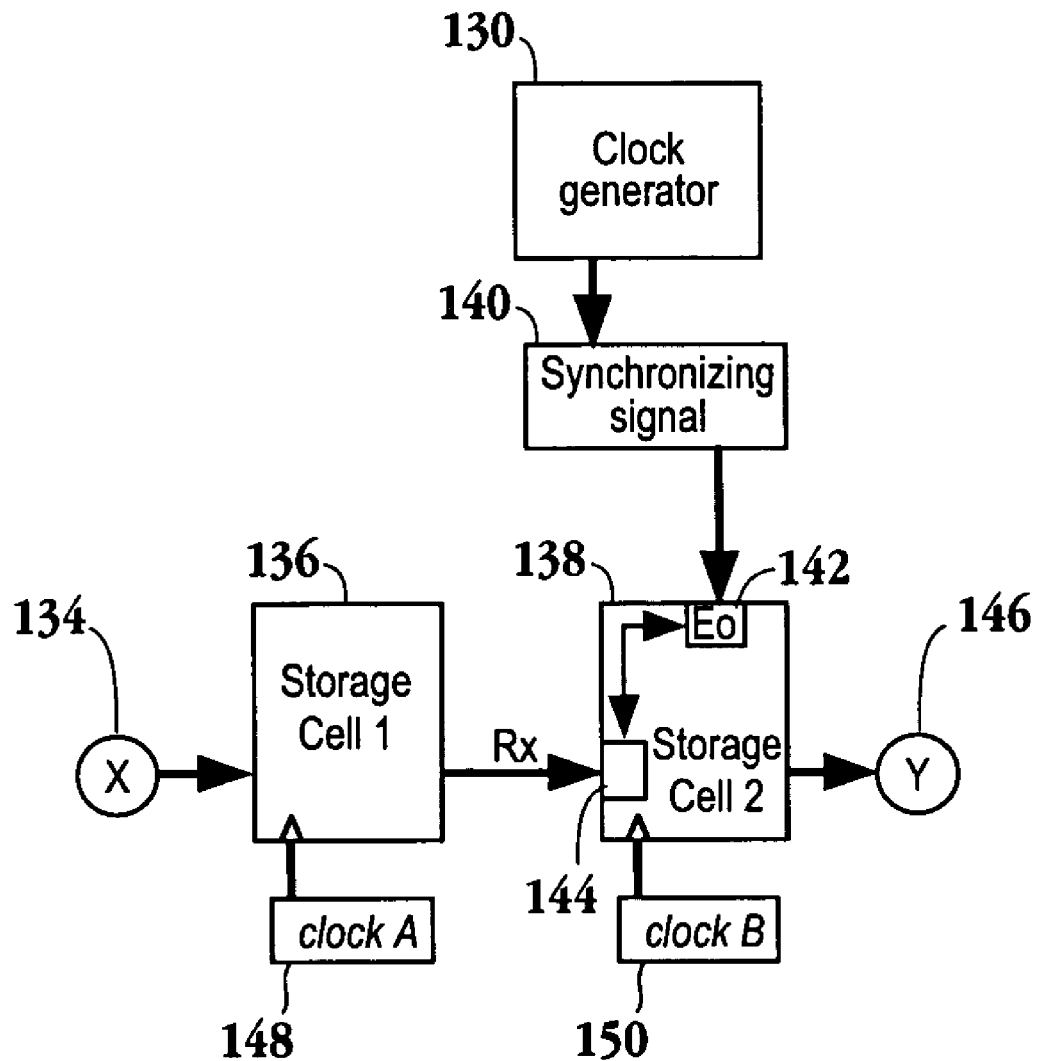
FIG. 3 is a more detailed schematic diagram illustrating the modules associated with the communication of data across different clock domains in accordance with one embodiment of the invention.

FIG. 3 is a more detailed schematic diagram illustrating the modules associated with the communication of data across different clock domains in accordance with one embodiment of the invention. Here, data is being transferred from, storage cell 1 136 associated with clock A 148 to storage cell 2 138 which is associated with clock B 150. Value X 134 is provided to storage cell 1 136 for transmission to storage cell 2 138, which will eventually output value Y 146. Clock generator 130 generates a synchronization signal 140 which is communicated to storage cell 2 138. Synchronization signal 140 causes an enable signal 142 to be communicated to a receipt module 144 of storage cell 2 138. Receive module 144 is enabled to receive the data being transmitted from storage cell 1 136.

Figure 4:
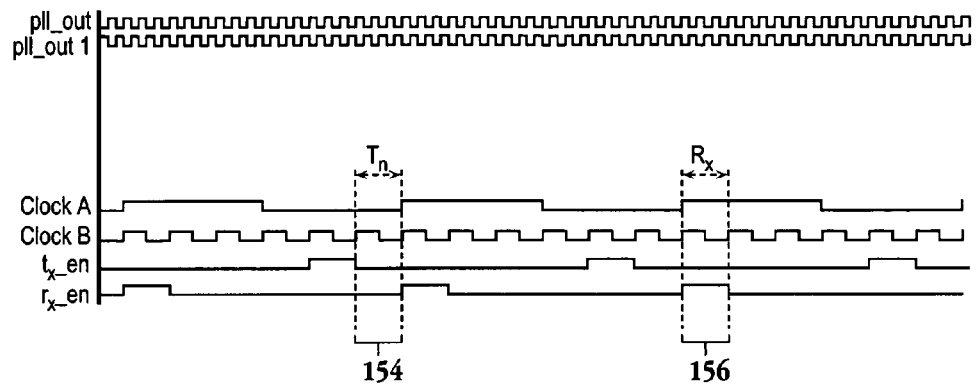
FIG. 4 is an exemplary illustration of the wave forms associated with the transfer of data across different clock domains where the clock domains are associated with an even clock ratio in accordance with one embodiment of the invention.

FIG. 4 is an exemplary illustration of the wave forms associated with the transfer of data across different clock domains where the clock domains are associated with an even clock ratio in accordance with one embodiment of the invention. Here, clock A is associated with a slower clock speed than the clock speed of clock B. The transmit synchronization signal (TX_EN) and the receive synchronization signal (RX_EN) are both based on the faster clock speed. Thus, the transitions indicated by the transmit synchronization signal and the receive synchronization signal initiate on a rising edge of the fast clock. For transmission of data from a fast clock domain to a slower clock domain, the transmit synchronization signal is asserted such that there is one fast clock cycle between its assertion and the rising edge of the slow clock. This feature is illustrated in region 154 of FIG. 4. For the receipt of data into a storage cell associated with a fast clock from a storage cell associated with a slow clock, the receive synchronization signal is asserted on the rising edge of each slow clock as illustrated in region 156 of FIG. 4. FIG. 4 illustrates the waveforms being received at an interface, after flop repitition. The clock ratio associated with FIG. 4 is 12:2 and refers to the number of phase-locked loop (pll) cycles in one slow clock period to those in one fast clock period (which is always 2).

Figure 5:
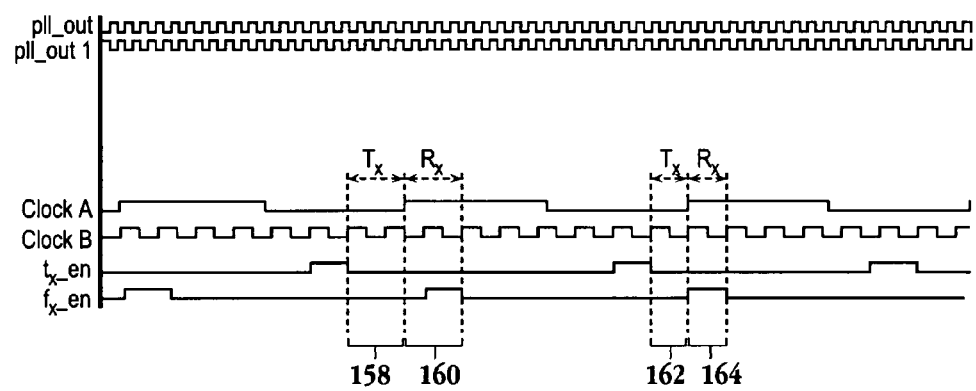
FIG. 5 is an exemplary illustration of the wave forms associated with the transmission of data across clock domains where ratio of the clock domains is odd in accordance with one embodiment of the invention.

It should be appreciated that even clock ratios have the form 2n:2, where n is an integer. A property of even ratios is that every rising edge in the slow domain coincides with a rising edge in the fast clock domain. In order to receive data generated on the rising edge of the slow clock domain, and allowing for a cycles' worth of transmission time, the rx_en sync pulse is asserted on the rising edge of each slow clock. The following expression captures this feature:

$rx\_en=1$ in the interval $[2mn, 2mn+1]$, $\forall m=0, 1, 2 \ldots$ and $n$ is a constant $\in N$=0 otherwise Considering the transmit enable side, the tx_en sync pulse is asserted such that there is one fast clock between its assertion and the rising edge of the slow clock. Thus, the tx_en is fixed around the slow clock rising edge, and from a frequency point of view, is identical to the rx_en, although there is a phase difference (since it is not asserted at time t=0). The expression associated with the tx$_{13}$en sync pulse is as follows:

$tx\_en=1$ in the interal $[2mn+d, 2mn+d+1]$, $\forall m=0, 1, 2 \ldots$, $n$ is a constant $\in N$ and $d=2n-4=0$ otherwise FIG. 5 is an exemplary illustration of the wave forms associated with the transmission of data across clock domains where ratio of the clock domains is odd in accordance with one embodiment of the invention. Here again, clock B is associated with a faster clock cycle than clock A. A property of odd clock ratios is that alternate rising edges of the slow clock coincide with the rising edges of the fast clock. The remainder of the rising edges of the slow clock coincide with falling edges of the fast clock. Thus, for odd clock ratios the receive and transmit windows are an extra half-cycle longer relative to the fast clock cycle. Transmit region 158 and receive region 160 illustrate the extra half clock cycle as compared to the even ratio embodiment with reference to FIG. 4. It should be appreciated that the falling edge of the transmit synchronization signal is aligned with the rising edge of the signal associated with clock B. However, regions 162 and 164 for the respective transmit in receipt regions illustrate regions associated with one clock cycle of clock B similar to an even clock ratio embodiment. It should be appreciated that this pattern will alternate for the even clock ratio. FIG. 5 illustrates an odd clock ratio of 13:2. Qualitatively, the sync pulse is a signal generated from the fast clock such that transfers from the slow clock (dram or jbus) to fast clock and vice versa can be made safely. The implication of the fact that fast clock is used to generate a sync waveform is that all transitions on this waveform occur on a rising edge of the fast clock.

It should be appreciated that odd clock ratios have the form 2n+1:2, where n is an integer. A property of odd clock ratios is that alternate rising edges of the slow clock coincide with rising edges of the fast clock domain. The remainder of the rising edges coincide with falling edges on the fast domain. At time t=0, under the assumption that all frequencies have a coincident rising edge at reset deassertion, it can be guaranteed that edges at time t=0, 4n+2, 8n+4, . . . coincide with rising edges on the fats clock while edges at time t=2n+1, 6n+3, 10n+5 . . . coincide with falling edges on the fast clock.

At time t=0, under the above assumption, both clocks have a coincident rising edge, therefore a pulse is generated. On the following rising edge of the slow clock at time t=2n+1, the fast clock has a falling edge. In order to enable the sync pulse generation logic to work based on the fast clock, and to exclusively use rising edge flops, the sync pulse is generated at time t=2n+2. The following equation generalizes this relationship:

$rx\_en=1$ for the intervals $[2mn+2, 2mn+3]\forall m=1, 3, 5 \ldots$ and $[m(2n+1), m(2n+1)+1]\forall m=0, 2, 4 \ldots n$ is a constant $\in N$=0 otherwise As above, the transmit enable, tx_en is identical to the rx_en as far as shape and frequency are concerned, but includes a phase offset, d. The following equation generalizes this relationship taking into account the phase offset:

$tx\_en=1$ for the intervals $[2mn+2+d, 2mn+3+d]$ $\forall m=1, 3, 5 \ldots$ and $[m(2n+1)+d, m(2n+1)+1+d]\forall m=0, 2, 4 \ldots n$ is a constant $\in N$, $d=2n-4=0$ otherwise.

It should be appreciated that the behavior of the sync pulses represented in FIGS. 4 and 5 may be summarized as follows: the receive enable is asserted such that data generated on the positive edge of the slow clock is sampled within at most 1.5 clock cycles and at least 1 clock cycle of the fast clock. Similarly, while sending data from the fast clock domain to the slow clock domain, the transmit enable is asserted such that data has at most 1.5 clock cycles and at least 1 clock cycle of the fast clock to be flopped on the rising edge of the slow clock.

One skilled in the art will appreciate that although the diagrams show square waves with the sync pulses (to be used as enables to flops) deasserting on the edge when the flop samples the data, clk-to-q+RC delay on the sync pulse signal will guarantee that the pulse has sufficient hold time. Furthermore, the following assumptions are associated with the derivation of the analytical expressions for the sync pulse wave forms with reference to FIGS. 4 and 5: 1) all frequencies have a coincident rising edge at reset deassertion; 2). consider time to be a discrete qty t with t=0 at reset deassertion; 3). time scale is the same as phase-locked loop (pll) output clock period, i.e., the value of t increments at the beginning of each new pll output clock period; and 4) the sync pulse is one fast clock wide.

Figure 6:
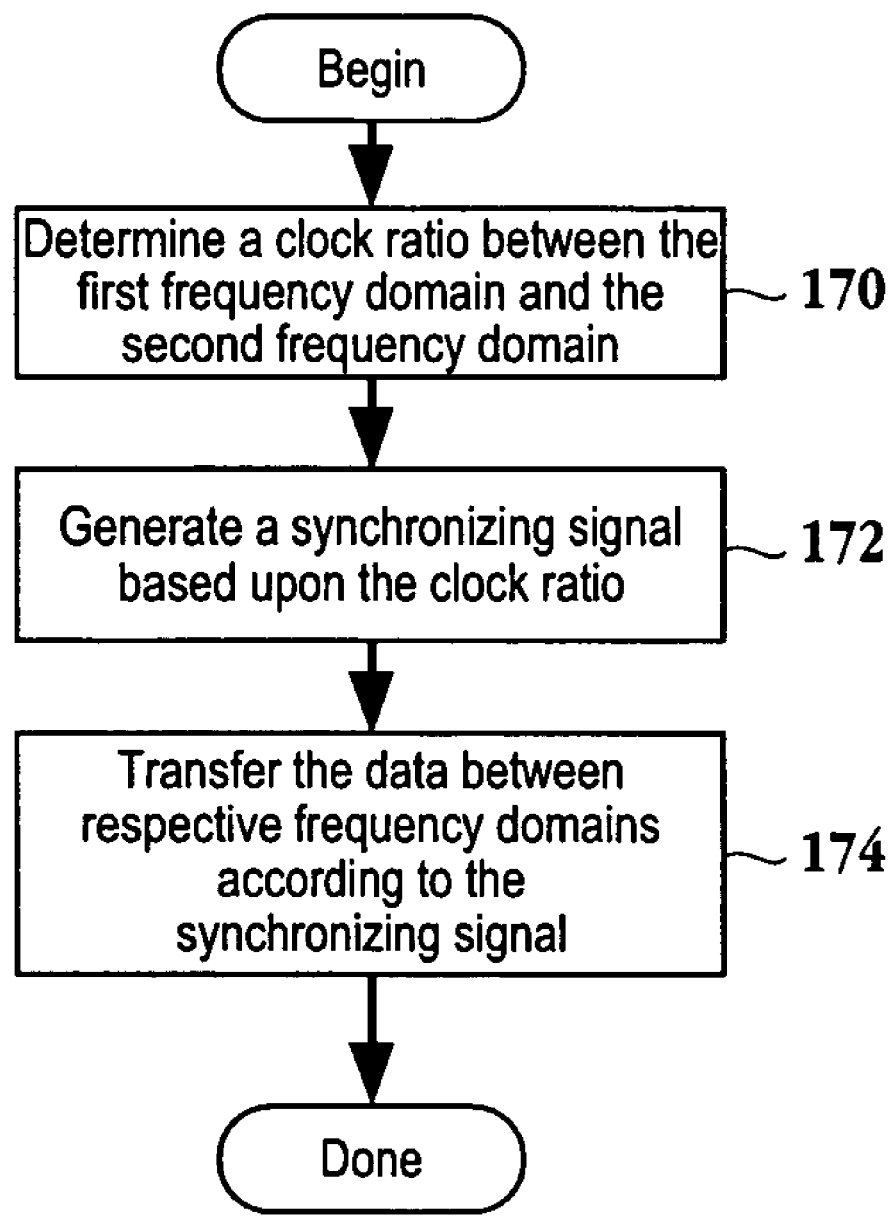
FIG. 6 is a flow chart diagram illustrating the method operations associated with a method for communicating data across first and second frequency domains of an integrated microchip in accordance with one embodiment of the invention.

FIG. 6 is a flow chart diagram illustrating the method operations associated with a method for communicating data across first and second frequency domains of an integrated microchip in accordance with one embodiment of the invention. The method initiates with operation 170 where a clock ratio between the first frequency domain and the second frequency domain is determined. Here, an even or odd clock ratio is determined. The method then advances to operation 172 where a synchronizing signal is generated. The synchronizing signal is based upon the clock ratio. That is, as described with reference to FIGS. 4 and 5, an odd or an even clock ratio will determine the wave form for the synchronization signals. The method then proceeds to operation 174 for the data between respective frequency domains is transferred according to the synchronizing signals. In one embodiment, the corresponding receive or transmit registers in the faster clock domain are not able to allow for the transfer of the data between frequency domains. In one embodiment, the synchronizing signals are based on a faster clock speed. As described above, a clock generator is configured to generate the clock cycles associated with clock domain A and clock domain B. Therefore, through logic in the clock generator, the synchronizing signals can be determined based upon a ratio of clock A and clock B in order to provide safe reception windows.

Figure 7:
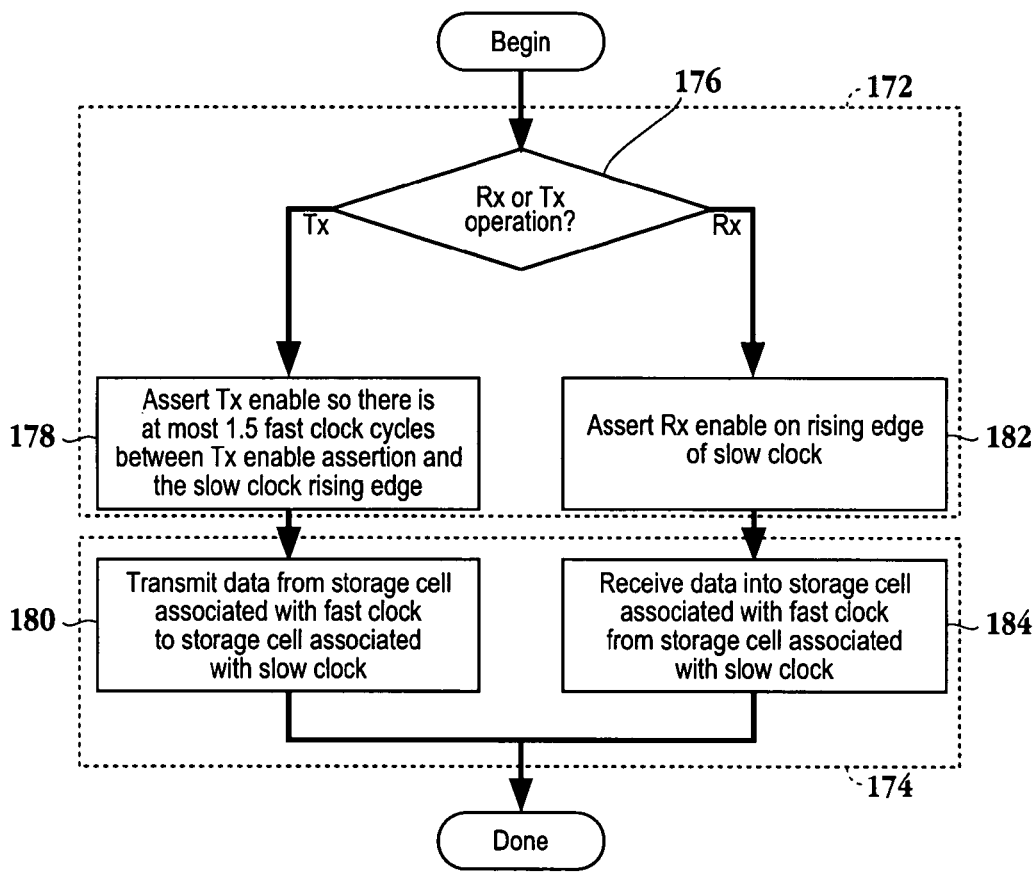
FIG. 7 is a more detailed flow chart diagram of method operations 172 and 174 of FIG. 6.

FIG. 7 is a more detailed flow chart diagram of method operations 172 and 174 of FIG. 6. Here, method operation 172 with reference to FIG. 6 may be defined further through method operations 176, 178 and 182 of FIG. 7. Similarly, method operation 174 with reference to FIG. 6 may be defined further through method operations 180 and 184 of FIG. 7. Decision operation 176 determines if a transmit or a receive operation is being performed. If a receive operation is being performed into a storage cell associated with the synchronizing signals, then the method proceeds to operation 182 where a receive enable is asserted on a rising edge of each slow clock or at the next fast edge after the rising edge of the slow clock. As mentioned above with reference to FIG. 5, a half-cycle delay may be incurred when dealing with an odd clock ratio. Here, the extra half-clock cycle is incurred on alternating slow clock cycles. The method then moves to operation 184 where the data is received into a storage cell associated with a fast clock domain from a storage cell associated with a slow clock domain. This receive operation depicts the steps associated with the embodiment described with reference to FIG. 3. If the operation is a transmit operation from a storage cell associated with a fast clock then the method proceeds from operation 176 to operation 178. In operation 178 a transmit enable signal is asserted so that there is at most one and a half fast clock cycles between the transmit enable assertion and the slow clock rising edge. As described above, if the clock ratio is an even clock ratio, then there will be one fast clock cycle between the transmit enable assertion and the slow clock rising edge. However, if the clock ratio is an odd clock ratio there will be 1.5 fast clock cycles between the transmit enable assertion and the slow clock rising edge. The method then proceeds to operation 180 where data from the storage cell associated with the fast clock is transmitted to the storage cell associated with the slow clock.

In summary, the present invention provides a scheme for synchronous data transfers across clock domains. Through the determination of a clock ratio, safe reception and transmission windows are defined as discussed with reference to FIGS. 4 and 5. In one embodiment, the receive or transmit registers of a storage cell in the faster clock domain are enabled. Thus, the storage cells of the different clock domains may be of a similar design, i.e., there is no need for the double synchronization configuration. Additionally, the synchronization signals allow for deterministic behavior in that it may be determined when the transfer of data will occur since the synchronization signals are based on the faster clock cycle. Consequently, the embodiments provide a lower latency transmission method than a fully asynchronous solution. Accordingly, overhead associated with both design complexity and latency of the data transfer are minimized. It should be appreciated that the embodiments described herein may be applied to any suitable clock domains and any suitable cells in different clock domains through which data is transferred.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessorbased or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for communicating across first and second frequency domains of an integrated microchip, comprising:
    determining a clock ratio between the first frequency domain and the second frequency domain, the first frequency domain associated with a faster clock cycle;
    identifying if the clock ratio is one of an odd clock ratio and an even clock ratio, the odd clock ratio having a form of 2n:2, the even clock ratio having a form of 2n+1:2;
    generating a synchronizing signal based upon the clock ratio, the synchronizing signal coordinating communication of data between the first and second frequency domains; and
    transferring the data between respective frequency domains according to the synchronizing signal.

2. The method of claim 1, wherein the method operation of transferring the data between respective frequency domains according to the synchronizing signal includes,
    initiating the transferring within, at most, 1.5 clock cycles of the faster clock cycle.

3. The method of claim 1, wherein the method operation of generating the synchronizing signal based upon the clock ratio includes,
    asserting a receive enable synchronization signal to a storage cell associated with the first frequency domain wherein a rising edge of the receive enable synchronization signal is aligned with a rising edge of a clock cycle associated with the second frequency domain.

4. The method of claim 1, wherein the method operation of generating the synchronizing signal based upon the clock ratio includes,
    asserting a transmit enable synchronization signal to a storage cell associated with the first frequency domain wherein the transmit enable synchronization signal is configured to cause transmission of the data within 1.5 cycles of the faster clock cycle.

5. The method of claim 1, wherein n is an integer.

6. The method of claim 1, wherein the method operation of determining the clock ratio between the first frequency domain and the second frequency domain includes,
   determining one of whether each rising edge of a clock cycle associated with the second frequency domain coincides with a rising edge of the faster clock cycle and whether alternate rising edges of the clock cycle associated with the second frequency domain coincides with corresponding alternate rising edges of the faster clock cycle.

7. An apparatus configured to communicate data across different frequency domains, comprising:
   a first storage cell operating at a first clock frequency;
   a second storage cell operating at a second clock frequency, the second storage cell designed to receive an output of the first storage cell, the second clock frequency being faster than the first clock frequency;
   a clock generator configured to identify if a ratio of the first clock frequency and the second clock frequency is one of an odd clock ratio or an even clock ratio, the odd clock ratio having a form of 2n:2, the even clock ratio having a form of 2n+1:2, where n is an integer; and
   synchronizing signal circuitry being associated with the second storage cell, the synchronizing signal circuitry being configured to control acceptance of the output of the first storage cell through a synchronizing signal, the synchronizing signal correlating the second clock frequency to the first clock frequency in order to define a window for communicating data between the first storage cell and the second storage cell.

8. The apparatus of claim 7, wherein the first storage cell and the second storage cell are flip-flop storage circuits.

9. The apparatus of claim 7, wherein the synchronizing signal is one of a transmit enable synchronizing signal and a receive enable synchronizing signal.

10. The apparatus of claim 7, further comprising:
    a clock generator, the clock generator producing both a waveform associated with the first clock frequency and a waveform associated with the second clock frequency, the clock generator further configured to generate synchronization waveforms correlating the first clock frequency and the second clock frequency.

11. The apparatus of claim 10, wherein the synchronization waveforms are based on the second clock frequency.

12. The apparatus of claim 7, wherein the synchronizing signal is configured so that each rising edge of a pulse of the synchronizing signal is aligned with a corresponding rising edge of a pulse associated with the second clock frequency.

13. An electronic system comprising:
    a microchip having a first region operating at a first clock speed and a second region operating at a second clock speed, the microchip including;
    a first storage cell operating at the first clock speed;
    a second storage cell operating at the second clock speed, the second storage cell designed to receive an output of the first storage cell, the second clock speed being faster than the first clock speed;
    a clock generator configured to identify if a ratio of the first clock freciuency and the second clock frequency is one of an odd clock ratio or an even clock ratio, the odd clock ratio having a form of 2n:2, the even clock ratio having a form of 2n+1:2, where n is an integer; and
    synchronizing signal circuitry being associated with the second storage cell, the synchronizing signal circuitry being configured to control acceptance of the output of the first storage cell through a synchronizing signal, the synchronizing signal correlating the second clock speed to the first clock speed in order to define a window for communicating data between the first storage cell and the second storage cell; and
    logic for generating values provided to the first and second storage cells.

14. The system of claim 13, wherein the synchronizing signal is one of a transmit enable synchronizing signal and a receive enable synchronizing signal.

15. The system of claim 14, further comprising:
    a clock generator, the clock generator producing both a waveform associated with the first clock speed and a waveform associated with the second clock speed, the clock generator further configured to generate the synchronizing signal correlating the first clock speed and the second clock speed.

16. The system of claim 15, wherein the second clock speed is faster than the first clock speed and the synchronization signal is based on the waveform associated with the second clock speed.

17. The system of claim 13, wherein the synchronizing signal is configured so that each rising edge of a pulse of the synchronizing signal is aligned with a corresponding rising edge of a pulse associated with a waveform corresponding to the second clock speed.

* * * * *